United States Patent
Maitrejean et al.

(10) Patent No.: US 8,447,115 B2
(45) Date of Patent: May 21, 2013

(54) METHOD AND INSTALLATION FOR IMAGING

(75) Inventors: Serge Maitrejean, Paris (FR); Olivier Levrey, Chelles (FR); Pascal Desaute, Paris (FR)

(73) Assignee: Biospace Lab, Paris (FR)

( * ) Notice: Subject to any disclaimer, the term of this patent is extended or adjusted under 35 U.S.C. 154(b) by 566 days.

(21) Appl. No.: 12/517,437

(22) PCT Filed: Nov. 30, 2007

(86) PCT No.: PCT/FR2007/052425
§ 371 (c)(1),
(2), (4) Date: Jun. 3, 2009

(87) PCT Pub. No.: WO2008/068443
PCT Pub. Date: Jun. 12, 2008

(65) Prior Publication Data
US 2010/0080468 A1    Apr. 1, 2010

(30) Foreign Application Priority Data
Dec. 4, 2006 (FR) .................................. 06 10576

(51) Int. Cl.
*G06K 9/46* (2006.01)
*H01L 27/146* (2006.01)
*G01N 21/86* (2006.01)

(52) U.S. Cl.
USPC .................. 382/192; 250/370.08; 250/559.04

(58) Field of Classification Search ........................ None
See application file for complete search history.

(56) References Cited

U.S. PATENT DOCUMENTS

| | | | | |
|---|---|---|---|---|
| 4,830,494 A | * | 5/1989 | Ishikawa et al. | 356/336 |
| 5,508,524 A | * | 4/1996 | Goldberg et al. | 250/369 |
| 5,828,067 A | | 10/1998 | Rushbrooke et al. | |
| 6,512,854 B1 | * | 1/2003 | Mucci et al. | 382/275 |
| 6,600,161 B2 | | 7/2003 | Desaute et al. | |
| 2004/0094720 A1 | * | 5/2004 | Dagan et al. | 250/370.12 |

FOREIGN PATENT DOCUMENTS
GB    2350187 A    11/2000

OTHER PUBLICATIONS

Gal O. et al., Functioning of the Cartogam Portable Gamma Camera in a Photon Counting Mode, Nuclear Science Symposium Conference Record, 2000 IEEE, Lyon, France, vol. 1 pp. 6-308 to 6-312, Oct. 15, 2000, XP010556575.
Hill J.E. et al., Readout Modes and Automated Operation of the Swift X-Ray Telescope, Proc. Spie, vol. 5165, Feb. 2004, pp. 217-231, XP002429211.

(Continued)

*Primary Examiner* — Andrew W Johns
*Assistant Examiner* — David F Dunphy
(74) *Attorney, Agent, or Firm* — BCF LLP

(57) ABSTRACT

(a) a measurement $F_0(x, y, \delta t)$ of the signals detected is provided; (b) on the one hand a first value $F_1(X, y, \delta t)$ is provided, termed the "integration" value and on the other hand a second value $F_2(x, y, \delta t)$ termed the "count" value is provided; (c) a value $F_e(x_0, y_0, \delta t)$ of a number of signals is estimated from a combination of first $F_1(X_0, y_0, \delta t)$ and second $F_2(x_0, y_0, \delta t)$ values, on the basis of a criterion of detection in the neighborhood.

18 Claims, 2 Drawing Sheets

OTHER PUBLICATIONS

Kraft E. et al., Counting and Integrating Readout for Direct Conversion X-Ray Imaging—Concept, Realization and First Prototype Measurements, Nuclear Science Symposium Conference Record, 2005 IEEE Wyndham El Conquistador Resort, Puerto Rico, Oct. 23-29, 2005, pp. 2761-2765, XP010896238.

Search Report for PCT/FR2007/052425, Mar. 7, 2008, Borotschnig, Hermann.
Search Report for FR0610576, Apr. 13, 2007, Borotschnig, Hermann.

* cited by examiner

METHOD AND INSTALLATION FOR IMAGING

CROSS-REFERENCE TO RELATED APPLICATIONS

The present application is the United States National Stage of PCT/FR2007/052425 filed Nov. 30, 2007. The present application claims the benefit of priority to French patent application no. 06 10576 filed Dec. 4, 2006. Both of these applications are incorporated herein by reference.

FIELD OF THE INVENTION

The present invention relates to imaging methods and installations.

BACKGROUND OF THE INVENTION

Document GB 2 350 187 describes an example of a method in which, on detection of a signal, a check is carried out to see if the detection corresponds more to a counting mode, or to an integration mode, and in which, according to this determination, an estimated value is obtained of the signal corresponding either to the count signal or to the integration signal, even to a combination of these two signals. The benefit of such a method is in particular to be able to enhance the dynamic scale of detection.

However, the measurement described in this document is obtained from a photomultiplier, so that it is a single-pixel approach, for which the method seeks to ascertain the detection level, but not the location of origin of the signal. There is therefore a need for an imaging method with good dynamic detection scale, making it possible to provide in addition an image of the detection.

SUMMARY OF THE INVENTION

To this end, the invention relates mainly to an imaging method comprising the following steps:
(a) for each of a set of areas (x; y) to be observed of an observation region, and for an instant $\delta t$ of an observation period T, a measurement $F_0(x, y, \delta t)$ is provided of the detected signals corresponding to a radiation emission originating from said area during the instant $\delta t$,
(b) on the one hand a first value $F_1(x, y, \delta t)$ is provided, termed "integration" value, being an estimation of the intensity of the detected signals originating from said area during the instant, and on the other hand a second value $F_2(x, y, \delta t)$ is provided, termed "count" value, being an estimate of the number of detected signals originating from said area during the instant, $F_2(x, y, \delta t)$ being obtained by assigning, for a set of contiguous areas where the measurement $F_0(x, y, \delta t)$ is non-zero forming a detection spot:
  one signal unit at the barycenter of said spot, and
  zero signal unit in the other areas of the spot,
(c) in at least one concerned area $(x_0; y_0)$ of said set of areas, a value $F_e(x_0, y_0, \delta t)$ of the number of signals in the concerned area $(x_0; y_0)$ during said instant is estimated from at least a combination of the first $F_1(x_0, y_0, \delta t)$ and second $F_2(x_0, y_0, \delta t)$ values, in which, during the step (c), the following steps are implemented:
(c1) a neighborhood $R(x_0; y_0)$ is defined that forms a part of said set of areas, said neighborhood comprising at least the concerned area $(x_0; y_0)$ and neighboring areas (x1; y1) distinct of the concerned area,
(c2) a criterion of detection in the neighborhood is estimated based on measurements $F_0(x, y, \delta t)$ for neighboring areas (x; y) included in said neighborhood $R(x_0; y_0)$ during the observation period T, and
(c3) the value $F_e(x_0, y_0, \delta t)$ of the number of signals is estimated according, in addition, to at least said criterion of detection in the neighborhood.

Thanks to these arrangements, a method is obtained that is well suited to multiple-pixel detection. In particular, the estimation of the value $F_e$ of the number of signals is obtained by taking into account the detection in the spatial and/or temporal neighborhood of the concerned pixel.

In preferred embodiments of the invention, use may also be made of one and/or another of the following arrangements:
  when the criterion of detection in the neighborhood indicates a low detection level, the value $F_e(x_0, y_0, \delta t)$ of the number of signals is estimated as the second value $F_2(x_0, y_0, \delta t)$,
  when the criterion of detection in the neighborhood indicates a high detection level, the value $F_e(x_0, y_0, \delta t)$ of the number of signals is estimated as the first value $F_1(x_0, y_0, \delta t)$;
  when the criterion of detection in the neighborhood indicates an intermediate detection level between the low and high levels, the value $F_e(x_0, y_0, \delta t)$ of the number of signals is estimated as a combination of the first value $F_1(x_0, y_0, \delta t)$ and the second value $F_2(x_0, y_0, \delta t)$, each being weighted by a non-zero coefficient;
  when the criterion of detection in the neighborhood indicates said intermediate detection level, the value $F_e(x_0, y_0, \delta t)$ of the number of signals is estimated as a linear combination of the first value $F_1(x_0, y_0, \delta t)$ and the second value $F_2(x_0, y_0, \delta t)$ according to:

$$F_e(x_0, y_0, \delta t) = \alpha F_1(x_0, y_0, \delta t) + (1-\alpha) F_2(x_0, y_0, \delta t)$$

$\alpha$ being a coefficient in the range ]0; 1[ depending on the criterion of detection in the neighborhood;
  for the area $(x_0, y_0)$ and the instant $\delta t$ concerned, $\alpha$ depends on the measurement $F_0(x_0, y_0, \delta t)$ in that area for that instant;
  during the step (c2), the criterion of detection in the neighborhood is estimated from at least the measurements $F_0(x, y, \delta t)$ for neighboring areas $(x_1; y_1)$ included in said neighborhood $R(x_0; y_0)$ during the instant $\delta t$;
  the detection criterion relates to a number of areas $(x_1; y_1)$ of said neighborhood in which the measurement $F_0(x, y, \delta t)$ is less than a predetermined threshold;
  the detection criterion relates to an average of the measurement $F_0(x, y, \delta t)$ in said neighborhood;
  the steps (a), (b) and (c) are implemented at least for a first instant $\delta t_1$ and a second instant $\delta t_2$ distinct from the first instant, and for said first instant said criterion of detection in the neighborhood is estimated at least from the measurements $F_0(x, y, \delta t_2)$ for neighboring areas $(x_1; y_1)$ included in said neighborhood $R(x_0; y_0)$ during the second instant $\delta t_2$;
  the step (c) is implemented in a plurality of concerned areas;
  during the step (b), said first value $F_1(x, y, \delta t)$ is obtained according to said measurement $F_0(x, y, \delta t)$;
  before the step (a), a step (z) is implemented during which, for each of a set of areas (x; y) to be observed of an observation region, and for an instant $\delta t$ of an observation period, a signal is detected that corresponds to an emission of radiation originating from said area during the instant $\delta t$, said detection providing said measurement $F_0(x, y, \delta t)$;
  during the step (z), for each area of said set of areas (x; y) to be observed, and for said instant $\delta t$, a signal is detected that corresponds to an emission of light radiation originating from said area during the instant $\delta t$;

during the step (c2), said criterion of detection in the neighborhood is estimated also from the measurement $F_0(x_0, y_0, \delta t)$ for the concerned area $(x_0; y_0)$.

According to another aspect, the invention relates to a computer program product comprising program code portions suitable for implementing such a method when said program is run on a programmable machine.

According to another aspect, the invention relates to an imaging installation comprising:

(A) a memory storing, for each of a set of areas (x; y) to be observed of an observation region, and for an instant $\delta t$ of an observation period, a measurement $F_0(x, y, \delta t)$ of detected signals corresponding to an emission of radiation originating from said area during the instant $\delta t$, (B) a computer adapted to provide on the one hand a first value $F_1(x, y, \delta t)$, termed "integration" value, being an estimate of the intensity of the detected signals originating from said area during the instant, and on the other hand a second value $F_2(x, y, \delta t)$, termed "count" value, being an estimate of the number of detected signals originating from said area during the instant, $F_2(x, y, \delta t)$ being obtained by assigning, for a set of contiguous areas where the measurement $F_0(x, y, \delta t)$ is non-zero forming a detection spot:

one signal unit at the barycenter of said spot, and zero signal units in the other areas of the spot, said computer being adapted to estimate, in at least one concerned area $(x_0; y_0)$, chosen from said set of areas, a value $F_e(x_0, y_0, \delta t)$ of the number of signals in the concerned area $(x_0; y_0)$ during said instant from at least one combination of the first $F_1(x_0, y_0, \delta t)$ and second $F_2(x_0, y_0, \delta t)$ values, the computer being adapted to define a neighborhood $R(x_0; y_0)$ forming a part of said set of areas, said neighborhood comprising at least the concerned area $(x_0; y_0)$ and neighboring areas $(x1; y1)$ distinct from the concerned area, the computer being adapted to estimate a criterion of detection in the neighborhood, at least from the measurements $F_0(x, y, \delta t)$ for neighboring areas $(x_1; y_1)$ included in said neighborhood $R(x_0; y_0)$ during the observation period T, and the computer being adapted to estimate the value $F_e(x_0, y_0, \delta t)$ of the number of signals according in addition at least to said criterion of detection in the neighborhood.

In certain embodiments, it is also possible to provide:

a detection unit adapted to detect signals that correspond to an emission of radiation originating from said area during the instant $\delta t$, and to store the corresponding measurement $F_0(x, y, \delta t)$ in said memory;

the detection unit is adapted to detect optical signals.

Other features and benefits of the invention will become apparent from the following description of one of its embodiments, given by way of nonlimiting example, in light of the appended drawings.

DETAILED DESCRIPTION

In the various figures, the same references designate identical or similar elements.

Figure 1:
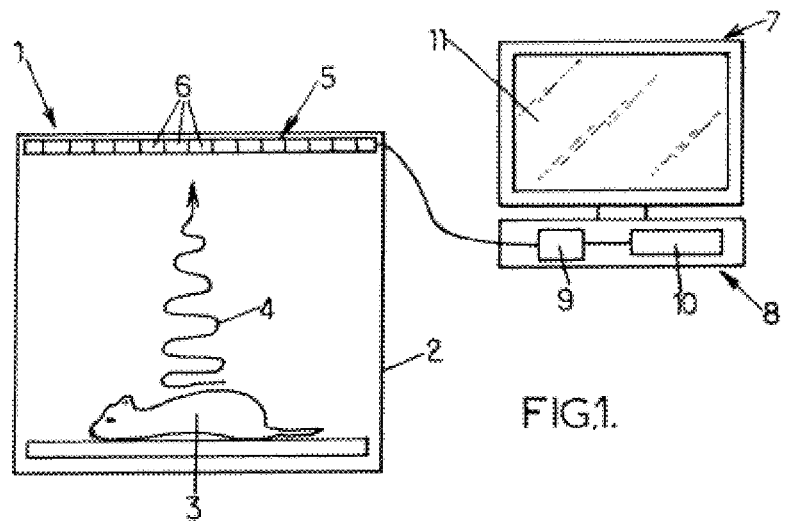
FIG. 1 diagrammatically represents an imaging installation.

FIG. 1 diagrammatically represents an imaging installation 1 comprising an enclosure in which a sample 3 to be imaged is positioned. The sample 3 emits a radiation 4 that is detected and possibly amplified by a detector or sensor 5 specially designed to detect the radiation 4. The detector 5 comprises a plurality of cells 6 conventionally arranged in rows and columns (a single row can be seen in FIG. 1) in the plane perpendicular to the plane of FIG. 1. The detector 5 is linked at the output to an information technology system 7 comprising a central processing unit 8 comprising a memory 9 in which the measurements obtained by the detector 5 are stored, and a processing unit 10 programmed to process the data stored in the memory 9 in the manner explained hereinbelow. The information technology system 7 can also include a screen 11 for displaying to a user the detected signal and/or the result of the processing by the processing unit 10, or other information.

By way of purely illustrative example, FIG. 1 represents a luminescence detection experiment during which a light radiation 4 is detected, emitted from inside an animal 3, for example a genetically modified mouse, positioned in a black box that is completely opaque to the external light. This light signal is, for example, representative of a chemical reaction taking place in the animal and can be used as a tracer for this chemical reaction. The radiation 4 can also be used to quantify the expression of a given gene carried by the animal 3 and which, when it is expressed, results in the previously-mentioned chemical reaction.

To measure such a radiation, a cooled CCD camera, an ICCD, an EMCCD (CCD with internal multiplication) or other is used as a detector 5, presenting, for example, approximately one (or several) million detection cells 6 arranged in a thousand columns of a thousand rows.

The observation is performed during an observation period T, for example a few minutes, or several hours, subdivided into observation instants $\delta t_1, \delta t_2, \ldots, \delta t_i, \delta t_n$, during each of which a measurement $F_0(x, y, \delta t_i)$ is obtained for each of the cells 6, identified by its coordinates (x, y) in the detection plane of the detector 5 relative to a predetermined origin, and stored in the memory 9 of the information technology system 7.

Figure 2:
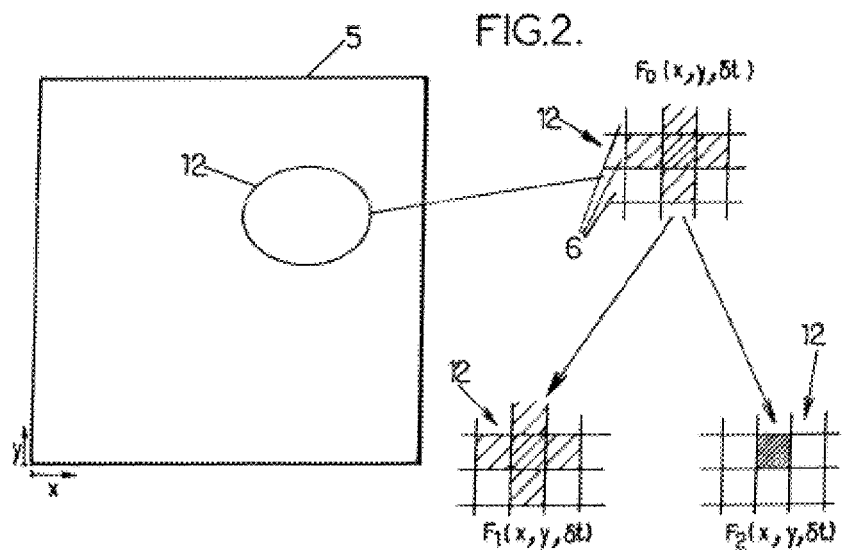
FIG. 2 diagrammatically represents an example of obtaining the values $F_1(x, y, \delta t)$ and $F_2(x, y, \delta t)$, FIG. 3 diagrammatically represents a step for obtaining $F_e(x_0, y_0, \delta t)$.

FIG. 2 shows, on the left, the plane of the detector 5, and top right, an enlarged portion of the signal measured in a region 12 of 20 detection cells. At the bottom of FIG. 2, first $F_1$ and second $F_2$ values are diagrammatically represented, obtained from the measurement $F_0$ as explained hereinbelow.

As represented in FIG. 2, the detection of an event, corresponding to the emission of a unique radiation event 4 from the sample 3 can be detected simultaneously by a number of detection cells 6 during a given instant $\delta t$. For example, a given cell represented in the center of the enlarged region 12 in FIG. 2, being the closest to the actual place of the emission of the radiation 4, will correspond to a maximum measurement, diagrammatically represented by a fairly strong density of shading in the representation of the measurement $F_0$ of FIG. 2. The neighboring cells may, however, have detected a portion of this unique radiation event, such that a non-zero measurement $F_0$ is also stored for these cells, as represented by the low-density shading in the representation of the measurement $F_0$ in FIG. 2. With the detector 5 also having a certain detection threshold, the measurement $F_0$ for the cells (x, y) in which this threshold has not been reached is stored as equal to zero in the memory 9. These cells are shown in white in the representation of the measurement $F_0$ in FIG. 2.

For each pixel identified by its coordinates (x, y), the measurement $F_0$ stored in the memory 9 therefore corresponds to zero if too weak a signal has been detected, during the instant δt, or to a non-zero measurement that can correspond to a portion of one or more radiations having taken place in proximity to the pixel concerned.

Once the measurements $F_0(x, y, \delta t)$ have been stored in the memory 9 for all the instants δt of the observation period T, an image, termed "count" image $F_2$ is obtained for each instant δt, being an estimate of the number of radiation events emitted in the area concerned, during the instant δt. For example, for each detection spot, corresponding to a set of contiguous non-zero measurement pixels $F_0$, the barycenter of this spot is identified, and it is assigned a value, termed "count" value, roughly corresponding to a signal unit, for example standardized. The value $F_2=0$ is assigned to the other pixels of the detection spot concerned. The "count" value $F_2$ can also be corrected if the relationship for the detector between the count calculated as explained hereinabove and the number of radiations actually emitted in the area concerned giving this calculated count is known experimentally or statistically. Statistically, it is in fact possible to know in advance that, for a number $N_0$ of radiations emitted during an instant δt in a given area, only a smaller number $N_1$, dependent on $N_0$, will be measured.

An image, termed "count" image, obtained from the values $F_2$, provides a very good resolution. Furthermore, it is known that the count provides statistically optimum data, independent of any source of fluctuations due to the sensor. However, such an image can prove too false for the quality of the results sought when too many close signals are emitted during one and the same instant δt, making it difficult to discern the individual events. In practice, in cases where numerous radiations are detected, during the instant δt, in one and the same area of the detector 5, the spots associated with each individual radiation are overlaid so that it is no longer possible to distinguish, during the instant δt, the individual events.

In the latter case, an image of value $F_1$, termed "integration" value, may be preferred, roughly corresponding, for each pixel of coordinates (x, y) to the signal quantity (intensity) detected during the instant δt in this pixel. In the example presented, $F_1$ is, for example, directly equal to $F_0$ for each pixel concerned. Such an image has a poorer resolution than the "count" image, but offers the benefit of providing a more correct value of the incident quantity on the sensor, in particular during strong detections.

Figure 3:
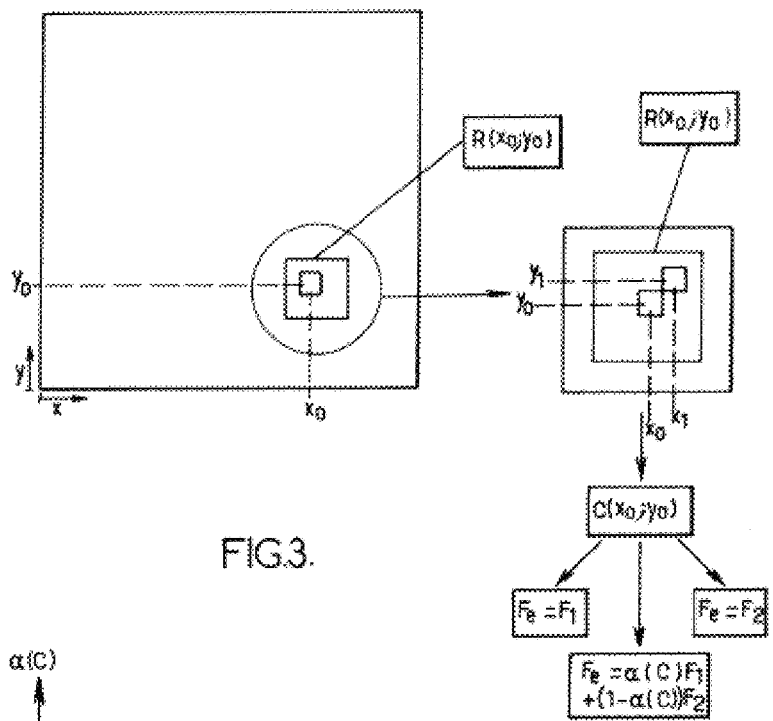

Once the calculation of the values $F_1$ and $F_2$ has been completed by the processing unit 10 for each pixel of coordinates (x, y) and for each instant δt, and the result has been stored in the memory 9, the processing unit 10 applies the processing diagrammatically represented in FIG. 3.

A pixel concerned of coordinates $(x_0; y_0)$ is considered. For example, all the pixels are considered in turn, each corresponding to a cell 6 of the detector 5. Alternatively, only the pixels for which the value $F_2(x_0, y_0, \delta t)$ is non-zero are considered.

For the pixel concerned, of coordinates $(x_0; y_0)$, a neighborhood $R(x_0, y_0)$ is defined, consisting of a few pixels, for example 25, or 100 pixels, surrounding the pixel concerned of coordinates $(x_0; y_0)$.

A criterion $C(x_0; y_0)$ is determined, relating to the detection level in the neighborhood $R(x_0; y_0)$ of the pixel concerned of coordinates $(x_0; y_0)$. The criterion $C(x_0, Y_0)$ indicate whether, in the neighborhood $R(x_0; y_0)$ of the pixel concerned, the detection is rather high level or low level. $C(x_0; y_0)$ obviously varies according to the pixel concerned, and the instant concerned.

To determine the criterion $C(x_0, Y_0)$ the measurement $F_0$, obtained for the pixels of coordinates $(x_1; y_1)$ other than that concerned, included in the neighborhood $R(x_0, Y_0)$ is used by way of example. It is possible to use either the measurement $F_0$ directly, or any other value obtained directly or indirectly from $F_0$, such as, in particular, $F_1$ or $F_2$ in these pixels.

For example, the proportion of pixels in the neighborhood $R(x_0, y_0)$ for which the measurement $F_0(x_1, y_1)$ is zero, or less than a predetermined threshold, for the instant δt concerned is used for the criterion $C(x_0, y_0)$ If a large number of pixels in the neighborhood presents a zero measurement $F_0$, in other words if it is detected that the case is one of low detection around the pixel concerned, a decision will be made to give to the value $F_e(x_0, y_0, \delta t)$ of the number of signals a value in which the count value $F_2(x_0, y_0, \delta t)$ of the number of signals will be predominant. In practice, as explained previously, $F_2$ is preferable in the low detection regions.

If it is detected that the number of neighboring pixels with zero measurement is less than a predetermined value, namely that it is a case of high detection around the pixel concerned $(x_0, y_0)$, a value in which the integration value $F_1(x_0, y_0, \delta t)$ will be predominant will be chosen for the value $F_e(x_0, y_0, \delta t)$ of the number of signals detected. In practice, as explained previously, $F_1$ is preferable in high detection regions.

Figure 4A:
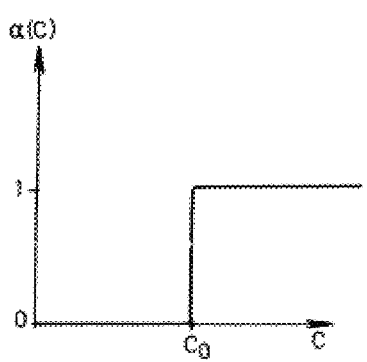
FIGS. 4a and 4b are graphs showing two possible variants for $\alpha(C)$.
Figure 4B:
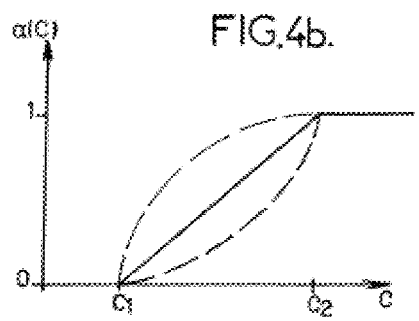

In any case, $F_e$ could be written as a combination of $F_1$ and $F_2$, for example a linear combination such that:
$F_e(x_0, y_0, \delta t)=\alpha F_1(x_0, y_0, \delta t)+(1-\alpha) F_2(x_0, y_0, \delta t)$, where the function a of the criterion $C(x_0, y_0)$ can be between 0 and 1, being, for example, piecewise constant as represented in FIG. 4a, in which case the value $F_e$ of the number of signals will be equal either to $F_1$ or to $F_2$ depending on the value of the criterion C relative to a predetermined value $C_0$ of the criterion C. As a variant, as represented in FIG. 4b, the function α (C) can include an increasing portion, for example continuous (in dotted lines), for example linear (solid lines), between two predetermined values $C_1$ and $C_2$ of the criterion. In the intermediate portion included between the values $C_1$ and $C_2$ of the criterion, α is within the range ]0; 1[. It will be noted that the parameter α depends on the criterion C at $(x_0, y_0)$ and consequently depends directly or indirectly on the measurement $F_0$ at $(x_0, y_0)$ and/or in the neighborhood of $(x_0, y_0)$.

Criteria other than the number of pixels presenting a measurement less than a predetermined threshold in the neighborhood $R(x_0, y_0)$ can be used.

As an example, it is possible, for example, to provide for the criterion to correspond to the average of the measurement $F_0(x, y, \delta t)$ over all of the pixels of coordinates (x; y) in the neighborhood $R(x_0, y_0)$ during the instant δt.

According to another variant, the criterion $C(x_0, y_0)$ can also depend on time.

In this case, the criterion, which can, for example, be one of the two criteria described previously, is estimated not only for the instant $\delta t_i$ for which the calculation $F_e(x_0, y_0, \delta t_i)$ is in progress, but also for the preceding instants $\delta t_{i-j}$ and subsequent instants $\delta t_{i+k}$ in a time neighborhood of the instant concerned. The use of such time criterion can make it possible to detect that, for the instant $\delta t_i$ concerned, a spurious radiation of cosmic or other type has also been picked up by the detector 5. The comparison of the measurement in the neighborhood of the pixel concerned, of coordinates $(x_0; y_0)$ for the instant $\delta t_i$, with the measurements in this same neighborhood at close instants, will make it possible to determine whether the measurement at the instant $\delta t_i$ includes the measurement of this cosmic radiation, and the calculation of an estimated value $F_e(x_0, y_0, \delta t_i)$ freed of this radiation.

The processing method described here in relation to FIG. 3 could also be applied to a signal obtained by detection of any type of radiation other than light radiations, as described here.

The invention claimed is:

1. An imaging method comprising the following steps:
   (a) for each of a set of areas to be observed of an observation region, and for an instant $\delta t$ of an observation period T, a measurement $F_0(x, y, \delta t)$ is provided of the detected signals corresponding to a radiation emission originating from said area during the instant $\delta t$,
   (b) on the one hand a first image of first values $F_1(x, y, \delta t)$ is provided from the measurement $F_0(x, y, \delta t)$, termed "integration" image, being an estimation of the intensity of the detected signals originating from said area during the instant, and on the other hand a second image of second values $F_2(x, y, \delta t)$ is provided from the measurement $F_0(x, y, \delta t)$, termed "count" image, being an estimate of the number of detected signals originating from said area during the instant, $F_2(x, y, \delta t)$ being obtained by assigning, for a set of contiguous areas where the measurement $F_0(x, y, \delta t)$ is non-zero forming a detection spot:
       one signal unit at the barycenter of said spot, and
       zero signal unit in the other areas of the spot,
   (c) in at least one concerned area of said set of areas, a value $F_e(x_0, y_0, \delta t)$ of the number of signals in the concerned area during said instant is estimated from at least a combination of the first $F_1(x_0, y_0, \delta t)$ and second $F_2(x_0, y_0, \delta t)$ values, in which, during the step (c), the following steps are implemented:
   (c1) a neighborhood $R(x_0; y_0)$ is defined that forms a part of said set of areas, said neighborhood comprising at least the concerned area and neighboring areas distinct of the concerned area,
   (c2) a criterion of detection level in the neighborhood is estimated based on measurements $F_0(x, y, \delta t)$ for neighboring areas included in said neighborhood $R(x_0; y_0)$ during the observation period T, and
   (c3) the value $F_e(x_0, y_0, \delta t)$ of the number of signals is estimated according, in addition, to at least said criterion of detection level in the neighborhood.

2. The imaging method as claimed in claim 1, in which: when the criterion of detection level in the neighborhood indicates a low detection level, the value $F_e(x_0, y_0, \delta t)$ of the number of signals is estimated as the second value $F_2(x_0, y_0, \delta t)$, when the criterion of detection level in the neighborhood indicates a high detection level, the value $F_e(x_0, y_0, \delta t)$ of the number of signals is estimated as the first value $F_1(x_0, y_0, \delta t)$.

3. The imaging method as claimed in claim 2, in which, when the criterion of detection level in the neighborhood indicates an intermediate detection level between the low and high levels, the value $F_e(x_0, y_0, \delta t)$ of the number of signals is estimated as a combination of the first value $F_1(x_0, y_0, \delta t)$ and the second value $F_2(x_0, y_0, \delta t)$, each being weighted by a non-zero coefficient.

4. The imaging method as claimed in claim 3, in which, when the criterion of detection level in the neighborhood indicates said intermediate detection level, the value $F_e(x_0, y_0, \delta t)$ of the number of signals is estimated as a linear combination of the first value $F_1(x_0, y_0, \delta t)$ and the second value $F_2(x_0, y_0, \delta t)$ according to:
   $F_e(x_0, y_0, \delta t) = \alpha F_1(x_0, y_0, \delta t) + (1-\alpha) F_2(x_0, y_0, \delta t)$, $\alpha$ being a coefficient in the range $]0; 1[$ depending on the criterion of detection level in the neighborhood.

5. The imaging method as claimed in claim 4, in which, for the area and the instant $\delta t$ concerned, $\alpha$ depends on the measurement $F_0(x_0, y_0, \delta t)$ in that area for that instant.

6. The method as claimed in claim 1, in which, during the step (c2), the criterion of detection level in the neighborhood is estimated from at least the measurement $F_0(x, y, \delta t)$ for neighboring areas included in said neighborhood $R(x_0; y_0)$ during the instant $\delta t$.

7. The imaging method as claimed in claim 6, in which the criterion of detection level relates to a number of areas of said neighborhood in which the measurement $F_0(x, y, \delta t)$ is less than a predetermined threshold.

8. The imaging method as claimed in claim 6, in which the criterion of detection level relates to an average of the measurement $F_0(x, y, \delta t)$ in said neighborhood.

9. The imaging method as claimed in claim 1, in which the steps (a), (b) and (c) are implemented at least for a first instant and a second instant distinct from the first instant, and in which, for said first instant, said criterion of detection level in the neighborhood is estimated at least from the measurements $F_0(x, y, \delta t_2)$ for neighboring areas included in said neighborhood $R(x_0; y_0)$ during the second instant.

10. The imaging method as claimed in claim 1, in which the step (c) is implemented in a plurality of concerned areas.

11. The imaging method as claimed in claim 1, in which, during the step (b), said first value $F_1(x, y, \delta t)$ is obtained according to said measurement $F_0(x, y, \delta t)$.

12. The imaging method as claimed in claim 1, in which, before the step (a), a step (z) is implemented during which, for each of a set of areas to be observed of an observation region, and for an instant $\delta t$ of an observation period, a signal is detected that corresponds to an emission of radiation originating from said area during the instant $\delta t$, said detection providing said measurement $F_0(x, y, \delta t)$.

13. The imaging method as claimed in claim 12, in which, during the step (z), for each area of said set of areas to be observed, and for said instant $\delta t$, a signal is detected that corresponds to an emission of light radiation originating from said area during the instant $\delta t$.

14. The method as claimed in claim 1, in which, during the step (c2), said criterion of detection level in the neighborhood is estimated also from the measurement $F_0(x_0, y_0, \delta t)$ for the concerned area.

15. A computer program product comprising a non-transitory computer-readable medium having program code thereon, which when run on a programmable machine, is adapted to perform the following steps:
   (a) for each of a set of areas to be observed of an observation region, and for an instant $\delta t$ of an observation period T, a measurement $F_0(x, y, \delta t)$ is provided of the detected signals corresponding to a radiation emission originating from said area during the instant $\delta t$,
   (b) on the one hand a first image of first values $F_1(x, y, \delta t)$ is provided from the measurement $F_0(x, y, \delta t)$, termed "integration" image, being an estimation of the intensity of the detected signals originating from said area during the instant, and on the other hand a second image of second values $F_2(x, y, \delta t)$ is provided from the measurement $F_0(x, y, \delta t)$, termed "count" image, being an estimate of the number of detected signals originating from said area during the instant, $F_2(x, y, \delta t)$ being obtained by assigning, for a set of contiguous areas where the measurement $F_0(x, y, \delta t)$ is non-zero forming a detection spot:
       one signal unit at the barycenter of said spot, and
       zero signal unit in the other areas of the spot,
   (c) in at least one concerned area of said set of areas, a value $F_e(x_0, y_0, \delta t)$ of the number of signals in the concerned area during said instant is estimated from at least a combination of the first $F_1(x_0, y_0, \delta t)$ and second $F_2(x_0, y_0, \delta t)$ values, in which, during the step (c), the following steps are implemented:

(c1) a neighborhood $R(x_0; y_0)$ is defined that forms a part of said set of areas, said neighborhood comprising at least the concerned area and neighboring areas distinct of the concerned area, (c2) a criterion of detection level in the neighborhood is estimated based on measurements $F_0(x, y, \delta t)$ for neighboring areas included in said neighborhood $R(x_0; y_0)$ during the observation period T, and (c3) the value $F_e(x_0, y_0, \delta t)$ of the number of signals is estimated according, in addition, to at least said criterion of detection level in the neighborhood.

16. An imaging installation comprising:

(A) a memory storing, for each of a set of areas to be observed of an observation region, and for an instant $\delta t$ of an observation period, a measurement $F_0(x, y, \delta t)$ of detected signals corresponding to an emission of radiation originating from said area during the instant $\delta t$, (B) a computer adapted to provide on the one hand a first image of first values $F_1(x, y, \delta t)$ from the measurement $F_0(x, y, \delta t)$, termed "integration" image, being an estimate of the intensity of the detected signals originating from said area during the instant, and on the other hand a image of second values $F_2(x, y, \delta t)$ from the measurement $F_0(x, y, \delta t)$, termed "count" image, being an estimate of the number of detected signals originating from said area during the instant, $F_2(x, y, \delta t)$ being obtained by assigning, for a set of contiguous areas where the measurement $F_0(x, y, \delta t)$ is non-zero forming a detection spot:

one signal unit at the barycenter of said spot, and zero signal units in the other areas of the spot, said computer being adapted to estimate, in at least one concerned area, chosen from said set of areas, a value $F_e(x_0, y_0, \delta t)$ of the number of signals in the concerned area during said instant from at least one combination of the first $F_1(x_0, y_0, \delta t)$ and second $F_2(x_0, y_0, \delta t)$ values, the computer being adapted to define a neighborhood $R(x_0; y_0)$ forming a part of said set of areas, said neighborhood comprising at least the concerned area and neighboring areas distinct from the concerned area, the computer being adapted to estimate a criterion of detection level in the neighborhood, at least from the measurements $F_0(x, y, \delta t)$ for neighboring areas included in said neighborhood $R(x_0; y_0)$ during the observation period T, and the computer being adapted to estimate the value $F_e(x_0, y_0, \delta t)$ of the number of signals according, in addition, at least to said criterion of detection level in the neighborhood.

17. The imaging installation as claimed in claim 16, also comprising a detection unit adapted to detect signals that correspond to an emission of radiation originating from said area during the instant $\delta t$, and to store the corresponding measurement $F_0(x, y, \delta t)$ in said memory.

18. The imaging installation as claimed in claim 17, in which the detection unit is adapted to detect light signals.

\* \* \* \* \*